US008606304B2

(12) United States Patent
Iwamura et al.

(10) Patent No.: US 8,606,304 B2

(45) Date of Patent: Dec. 10, 2013

(54) PAGING SIGNAL TRANSMISSION METHOD, MOBILE STATION AND RADIO BASE STATION

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 841 days.

(21) Appl. No.: 12/678,230

(22) PCT Filed: Sep. 11, 2008

(86) PCT No.: PCT/JP2008/066473

§ 371 (c)(1), (2), (4) Date: Jun. 22, 2010

(87) PCT Pub. No.: WO2009/035060

PCT Pub. Date: Mar. 19, 2009

(65) Prior Publication Data

US 2011/0021215 A1 Jan. 27, 2011

(30) Foreign Application Priority Data

Sep. 14, 2007 (JP) ................................ 2007-240252
Feb. 4, 2008 (JP) ................................ 2008-024620

(51) Int. Cl.
*H04Q 7/20* (2006.01)

(52) U.S. Cl.
USPC ..................... 455/458; 455/343.3; 455/422.1; 455/425; 455/426.1; 370/328; 370/338; 370/498; 370/311; 340/7.44

(58) Field of Classification Search
USPC .......... 370/338, 328, 311, 498, 312; 455/458, 455/343.2, 574, 422.1, 343.3, 425, 426.1; 340/7.44
See application file for complete search history.

(56) References Cited

U.S. PATENT DOCUMENTS

2005/0148348 A1* 7/2005 Cramby et al. ............... 455/458
2005/0233732 A1* 10/2005 Kwak et al. ............... 455/414.1

(Continued)

FOREIGN PATENT DOCUMENTS

JP 2003-259448 A 9/2003
JP 2004-221759 A 8/2004
JP 2006-509382 A 3/2006

(Continued)

OTHER PUBLICATIONS

Office Action for Chinese Patent Application No. 200880107115.3 issued Jul. 24, 2012, with English translation thereof (12 pages).

(Continued)

*Primary Examiner* — Ajit Patel
*Assistant Examiner* — Fred Casca
(74) *Attorney, Agent, or Firm* — Osha Liang LLP

(57) ABSTRACT

A paging signal transmission method according to the present invention includes: notifying, from a radio base station (eNB) to a mobile station (UE), a discontinuous reception interval and a total number of the groups, the discontinuous reception interval representing an interval at which discontinuous reception of the paging signal (PCH) is performed; determining, at the mobile station (UE), a timing for receiving the paging signal on the basis of the notified discontinuous reception interval and the notified total number of the groups; receiving, at the mobile station (UE), the paging signal transmitted from the radio base station (eNB), at the determined timing; and performing, at the mobile station (UE), incoming call processing, when the received paging signal is a paging signal addressed to the mobile station (UE).

15 Claims, 11 Drawing Sheets

START
RECEIVE NUMBER OF RADIO FRAMES (T) IN PAGING DRX INTERVAL AND TOTAL NUMBER OF GROUPS (N) ~S101
S102: T≥N ? YES / NO
S103: GROUP ID(G) = U mod N
S104: DETERMINE RADIO FRAMES TO WHICH PCH IS MAPPED — SFN mod T = $G \cdot \frac{T}{N}$
S105: GROUP ID(G) = U mod N
S106: DETERMINE RADIO FRAMES TO WHICH PCH IS MAPPED — SFN mod T = $\left\lfloor \frac{G}{N} \cdot T \right\rfloor$
S107: DETERMINE SUBFRAME TO WHICH PCH IS MAPPED — SUBFN = G mod$\left(\frac{N}{T}\right)$
S108: RECEIVE PCH
END

(56) References Cited

U.S. PATENT DOCUMENTS

| | | | | |
|---|---|---|---|---|
| 2008/0151843 | A1 * | 6/2008 | Valmikam et al. | 370/338 |
| 2008/0182596 | A1 * | 7/2008 | Wang et al. | 455/458 |
| 2010/0062795 | A1 * | 3/2010 | Lee | 455/458 |
| 2010/0279715 | A1 * | 11/2010 | Alanara et al. | 455/458 |

FOREIGN PATENT DOCUMENTS

| | | |
|---|---|---|
| WO | 2004/013978 A2 | 2/2004 |

OTHER PUBLICATIONS

Office Action for Japanese Application No. 2009-532228 dated Oct. 19, 2010, with English translation thereof (5 pages).

Office Action for Chinese Patent Application No. 200880107115.3 issued Apr. 16, 2013, with English translation thereof (12 pages).

International Search Report w/translation from PCT/JP2008/066473 dated Dec. 9, 2008 (4 pages).

Written Opinion from PCT/JP2008/066473 dated Dec. 9, 2008 (4 pages).

3GPP TSG-RAN WG2 #59, R2-073372; “Paging Procedure in LTE”; NTT DoCoMo, Inc. et al.; Athens, Greece; Aug. 20-24, 2007 (2 pages).

3GPP TS 36.300 v8.1.0; “Evolved Universal Terrestrial Radio Access (E-UTRA) and Evolved Universal Terrestrial Radio Access Network (E-UTRAN); Overall Description”; Jun. 2007 (106 pages).

* cited by examiner

RADIO BASE STATION eNB
BCCH
PDCCH #3
PDSCH #3
BCCH
PDCCH #2
PDSCH #2
BCCH
PDCCH #1
PDSCH #1
MOBILE STATION UE#3 (GROUP #3)
MOBILE STATION UE#2 (GROUP #2)
MOBILE STATION UE#1 (GROUP #1)

FIG. 3
(a)
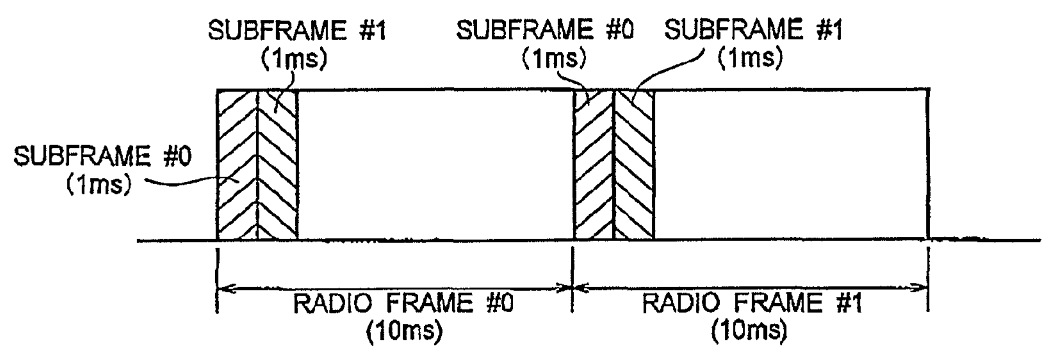
(b)
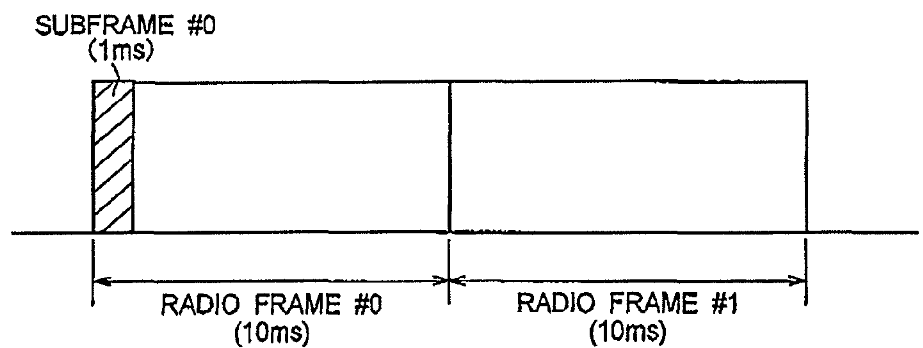

(a)
0 #1 #2 #3 #4 #5 #6 #7 #8 #9
(b)
0 #1 #2 #3 #4 #5 #6 #7 #8 #9
SUBFRAME OFFSET M = 3
(c)
BITMAP (10 BITS)
0 0 1 0 1 0 0 1 1 0
0 #1 #2 #3 #4 #5 #6 #7 #8 #9
(d)
MAPPING PATTERN (3 BITS)
0 1 1 1 1 1 1 1 1 1 1
1 1 0 0 0 0 1 0 0 0 0
7 1 1 0 0 0 1 1 0 0 0

FIG. 7

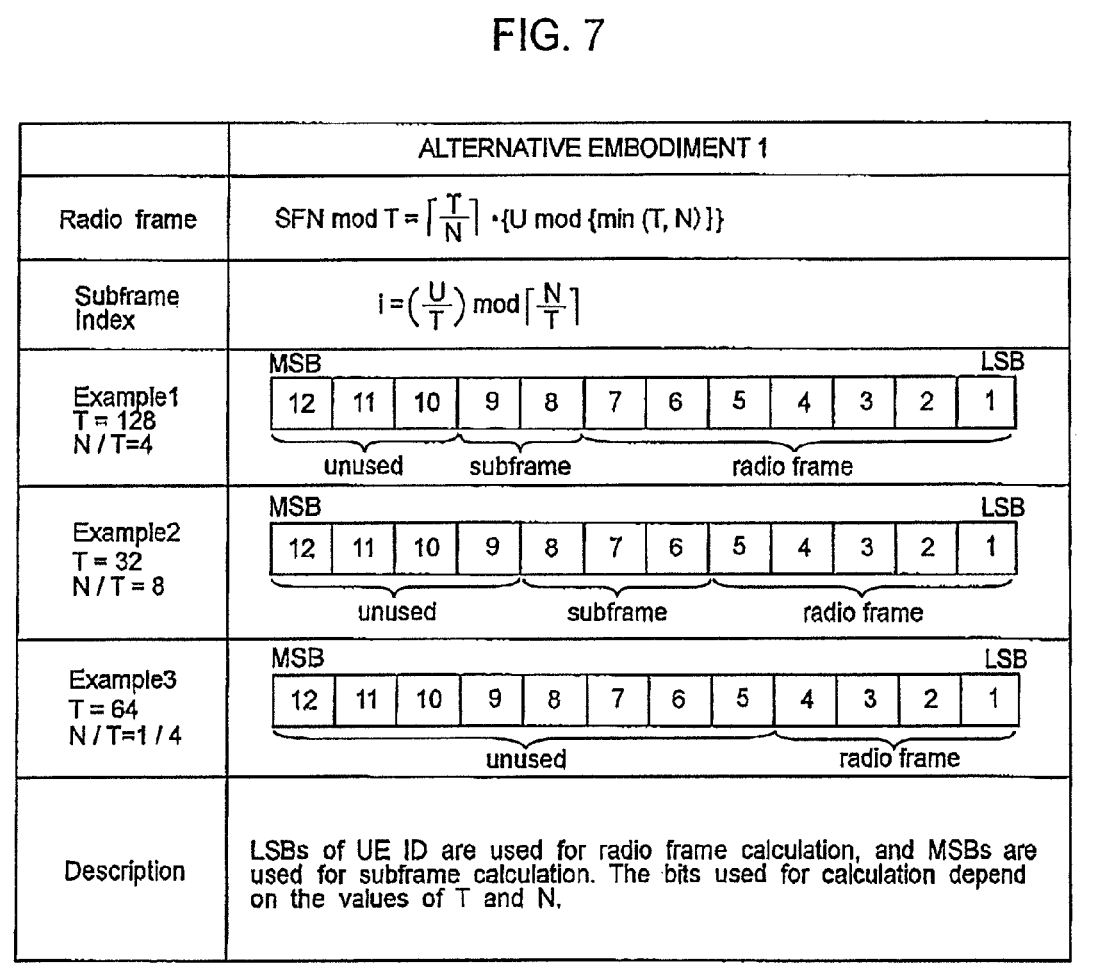

| | ALTERNATIVE EMBODIMENT 1 |
|---|---|
| Radio frame | SFN mod T = $\lceil \frac{T}{N} \rceil \cdot \{U \bmod \{\min(T, N)\}\}$ |
| Subframe Index | $i = \left(\frac{U}{T}\right) \bmod \lceil \frac{N}{T} \rceil$ |
| Example1 T = 128 N / T=4 | MSB [12 11 10] unused, [9 8] subframe, [7 6 5 4 3 2 1] radio frame LSB |
| Example2 T = 32 N / T = 8 | MSB [12 11 10 9] unused, [8 7 6] subframe, [5 4 3 2 1] radio frame LSB |
| Example3 T = 64 N / T=1 / 4 | MSB [12 11 10 9 8 7 6 5] unused, [4 3 2 1] radio frame LSB |
| Description | LSBs of UE ID are used for radio frame calculation, and MSBs are used for subframe calculation. The bits used for calculation depend on the values of T and N. |

FIG. 8

| | ALTERNATIVE EMBODIMENT 2 |
|---|---|
| Radio frame | $\text{SFN mod } T = \left\lfloor \frac{T}{N} \cdot (U \bmod N) \right\rfloor$ |
| Subframe Index | $i = U \bmod \left\lceil \frac{N}{T} \right\rceil$ |
| Example1<br>T = 128<br>N / T = 4 | MSB [12 11 10 9 8 7 6 5 4 3 2 1] LSB<br>bits 12–10: unused; bits 9–3: radio frame; bits 2–1: subframe |
| Example2<br>T = 32<br>N / T = 8 | MSB [12 11 10 9 8 7 6 5 4 3 2 1] LSB<br>bits 12–9: unused; bits 8–4: radio frame; bits 3–1: subframe |
| Example3<br>T = 64<br>N / T = 1 / 4 | MSB [12 11 10 9 8 7 6 5 4 3 2 1] LSB<br>bits 12–5: unused; bits 4–1: radio frame |
| Description | MSBs of UE ID are used for radio frame calculation, and LSBs are used for subframe calculation. The bits used for calculation depend on the values of T and N. |

FIG. 9

| | ALTERNATIVE EMBODIMENT 3 |
|---|---|
| Radio frame | $SFN \bmod T = \lceil \frac{T}{N} \rceil \cdot \{(\frac{U}{16}) \bmod \{\min(T, N)\}$ |
| Subframe index | $i = U \bmod \lceil \frac{N}{T} \rceil$ |
| Example1 T = 128 N / T = 4 | MSB 12 11 10 9 8 7 6 5 4 3 2 1 LSB; bits 11–5: radio frame; bits 2–1: subframe |
| Example2 T = 32 N / T = 8 | MSB 12 11 10 9 8 7 6 5 4 3 2 1 LSB; bits 9–5: radio frame; bits 3–1: subframe |
| Example3 T = 64 N / T = 1 / 4 | MSB 12 11 10 9 8 7 6 5 4 3 2 1 LSB; bits 12–9: unused; bits 8–5: radio frame; bits 4–1: unused |
| Description | Similar to Alt. 2 but the bit split is fixed irrespective of the values of T and N. This is achieved by using U / 16 in the radio frame formula (this is just an example to cover in case max 10 paging subframes can be configured per radio frame). |

FIG. 10

| mapping pattern# | # paging subframes per radio frame $N_{fr}$ | Description | Mapping | Paging capacity |
|---|---|---|---|---|
| 0 | 1/4 | 1 paging occasion per 4 radio frames | i = 0→subframe#9 | 2.5% |
| 1 | 1/2 | 1 paging occasion per 2 radio frames | i = 0→subframe#9 | 5% |
| 2 | 1 | 1 paging occasion per radio frame | i = 0→subframe#9 | 10% |
| 3 | 2 | 2 paging occasions per radio frame | i = 0→subframe#9<br>i = 1→subframe#4 | 20% |
| 4 | 4 | 4 paging occasions per 4 radio frame | i = 0→subframe#9<br>i = 1→subframe#4<br>i = 2→subframe#8<br>i = 3→subframe#3 | 40% |
| 5 | Reserved | – | – | – |
| 6 | Reserved | – | – | – |
| 7 | Reserved | – | – | – |

PAGING DRX INTERVAL
SUBFRAME #0 (GROUP #1)
SUBFRAME #0 (GROUP #2)
SUBFRAME #0 (GROUP #3)
SUBFRAME #0 (GROUP #1)
RADIO FRAME #0 (10ms)
RADIO FRAME #1 (10ms)
PDCCH (P-RNTI)
PDSCH (PCH-GROUP #1) (UE-ID)
1ms
PDCCH (P-RNTI)
PDSCH (PCH-GROUP #2) (UE-ID)
1ms
PDCCH (P-RNTI)
PDSCH (PCH-GROUP #3) (UE-ID)
1ms

PAGING SIGNAL TRANSMISSION METHOD, MOBILE STATION AND RADIO BASE STATION

TECHNICAL FIELD

The present invention relates to a paging signal transmission method in which a radio base station transmits a paging signal for notification of an incoming call for a mobile station belonging to any one of multiple groups, and also relates to the mobile station and the radio base station.

BACKGROUND ART

With reference to FIG. 11, description will be given of how a radio base station eNB in a mobile communication system of the LTE (Long Term Evolution) system operates to transmit a paging signal for notification of an incoming call for a mobile station UE belonging to any one of multiple groups #1 to #3 (that is, a paging signal transmission method).

As shown in FIG. 11, the radio base station eNB is configured to transmit a PDCCH (Physical Downlink Control Channel) including a P-RNTI (Paging-Radio Network Temporary Identifier), in a subframe for the group #1 (in the example in FIG. 11, a subframe #0 in a radio frame #0), upon detection of an incoming call for the mobile station UE belonging to the group #1.

Note that, the radio base station eNB is configured to use the PDCCH to notify, to the mobile station UE belonging to the group #1, the resource block position, the resource block size, and the like of a PDSCH (Physical Downlink Shared Channel) to which a PCH (Paging Channel) for the group #1 (i.e., a paging signal for notification of an incoming call for a mobile station UE belonging to the group #1) is mapped.

Moreover, the radio base station eNB is configured to use the PDSCH to make notification of identification information (UE-ID) on the mobile station UE which is to receive the above-described incoming call.

Meanwhile, the mobile station UE is configured to monitor whether or not the PDCCH including the P-RNTI is transmitted, at discontinuous reception intervals (paging DRX intervals) for the group #1.

The mobile station UE is configured to receive the PDSCH corresponding to the PDCCH, on the basis of information included in the PDCCH (e.g., the resource block position, the resource block size, and the like of the PDSCH), when judging that the PDCCH including the P-RNTI has been transmitted.

The mobile station UE is also configured to perform incoming call processing with the radio base station eNB, when the UE-ID included in the received PDSCH is a UE-ID addressed to itself.

Non-patent Literature 1: 3GPP TS36.300, "E-UTRA and E-UTRAN; Overall description; Stage 2", v8.1.0.

Non-patent Literature 2: R2-073372, "Paging Procedure in LTE", NTT DoCoMo, Inc., NEC.

However, with a conventional paging signal transmission method implementable in the mobile communication system of the LTE system, only one subframe (1 ms) is allowed to be set in each radio frame (10 ms) and used to transmit the PCH (paging signal) for each group.

Thus, such mobile communication system has a problem that the PCH may not possibly be mapped to the subframe in a case where the cell bandwidth is narrow, another signal (e.g., BCCH: Broadcast Control Channel or the like) is mapped to the subframe, or some other cases.

DISCLOSURE OF THE INVENTION

The present invention has been made in view of the above problem, and thus has an object to provide a paging signal transmission method, a mobile station, and a radio base station which allow a flexible change in the timing for transmitting a paging signal for each group.

A first aspect of the present invention is summarized as a paging signal transmission method in which a radio base station transmits a paging signal for notification of an incoming call for a mobile station belonging to any one of a plurality of groups, the method including the steps of: notifying, from the radio base station to the mobile station, a discontinuous reception interval and a total number of the groups, the discontinuous reception interval representing an interval at which discontinuous reception of the paging signal is performed; determining, at the mobile station, a timing for receiving the paging signal on the basis of the notified discontinuous reception interval and the notified total number of the groups; receiving, at the mobile station, the paging signal transmitted from the radio base station, at the determined timing; and performing, at the mobile station, incoming call processing, when the received paging signal is a paging signal addressed to the mobile station.

A second aspect of the present invention is summarized as a mobile station configured to receive a paging signal from a radio base station, the paging signal being used for notification of an incoming call for a mobile station belonging to any one of a plurality of groups, the mobile station including: a reception timing determining unit configured to determine a timing for receiving the paging signal, on the basis of an discontinuous reception interval and a total number of the groups notified by the radio base station, the discontinuous reception timing representing an interval at which discontinuous reception of the paging signal is performed; a paging signal receiver unit configured to receive the paging signal transmitted from the radio base station, at the timing determined by the reception timing determining unit; and an incoming call processor unit configured to perform incoming call processing, when the received paging signal is a paging signal addressed to the mobile station.

In the second aspect, the reception timing determining unit can be configured to determine that the timing is a subframe which is selected from among a plurality of subframes forming a radio frame to which the paging signal is mapped; and the paging signal can be transmitted only in one subframe in a plurality of radio frames.

In the second aspect, the reception timing determining unit can be configured to determine that the timing is subframes which are selected from among a plurality of subframes forming a radio frame to which the paging signal is mapped; and the paging signal can be transmitted in two or more subframes in one radio frame.

In the second aspect, the reception timing determining unit can be configured to determine that the timing is a predetermined subframe in radio frames specified by SFN calculated from the following formula:

$$G = U \bmod N \qquad \text{[Formula 3]}$$

$$SFN \bmod T = G \cdot \frac{T}{N}$$

where "T" represents the number of the radio frames included in the discontinuous reception interval, "N" represents the total number of the groups, "U" represents identification information on the mobile station, "G" represents identification information on the group to which the mobile station belongs, and "T≥N" is satisfied.

In the second aspect, the reception timing determining unit can be configured to determine that the timing is subframes corresponding to SUBFN in each of radio frames specified by SFN calculated from the following formula:

$$G = U \bmod N$$

$$SFN \bmod T = \left\lfloor \frac{G}{N} \cdot T \right\rfloor$$

$$SUBFN = G \bmod \left( \frac{T}{N} \right)$$

[Formula 4]

where "T" represents the number of the radio frames included in the discontinuous reception interval, "N" represents the total number of the groups, "U" represents identification information on the mobile station, "G" represents identification information on the group to which the mobile station belongs, and "T<N" is satisfied.

In the second aspect, the reception timing determining unit can be configured to determine the two or more subframes used to transmit the paging signal in the one radio frame, on the basis of an offset from a head subframe in the one radio frame, the offset being notified of by the radio base station.

In the second aspect, the reception timing determining unit can be configured to determine the two or more subframes used to transmit the paging signal in the one radio frame, on the basis of a bitmap indicating the two or more subframes to which the paging signal is mapped, the bitmap being notified of by the radio base station.

In the second aspect, the reception timing determining unit can be configured to determine the two or more subframes in the one radio frame, on the basis of a mapping pattern indicating a pattern of the two or more subframes to which the paging signal is mapped, the mapping pattern being notified of by the radio base station.

A third aspect of the present invention is summarized as a radio base station configured to transmit a paging signal for notification of an incoming call for a mobile station belonging to any one of a plurality of groups, the radio base station including: a paging signal transmitter unit configured to transmit the paging signal only in one subframe in a plurality of radio frames; and a notifier unit configured to notify, to the mobile station, an discontinuous reception interval and a total number of the groups, the discontinuous reception interval representing an interval at which discontinuous reception of the paging signal is performed, wherein a timing for the mobile station to receive the paging signal is determined based on the discontinuous reception interval and the total number of the groups.

A fourth aspect of the present invention is summarized as a radio base station configured to transmit a paging signal for notification of an incoming call for a mobile station belonging to any one of a plurality of groups, the radio base station including: a paging signal transmitter unit configured to transmit the paging signal in two or more subframes in one radio frame; a notifier unit configured to notify, to the mobile station, an discontinuous reception interval and a total number of the groups, the discontinuous reception interval representing an interval at which discontinuous reception of the paging signal is performed; and an adjuster unit configured to adjust the discontinuous reception interval and the total number of the groups, in accordance with the two or more subframes in which the paging signal is transmitted, wherein a timing for the mobile station to receive the paging signal is determined based on the discontinuous reception interval and the total number of the groups.

In the third or fourth aspect, the adjuster unit can be configured to adjust the discontinuous reception interval and the total number of the groups, in accordance with an amount of incoming call for each mobile station.

In the third or fourth aspect, the adjuster unit can be configured to adjust the discontinuous reception interval and the total number of the groups, in accordance with an available bandwidth in each cell.

In the third or fourth aspect, the adjuster unit can be configured to adjust the discontinuous reception interval and the total number of the groups, in accordance with a frequency of change in broadcast information in each cell.

In the fourth aspect, the radio frames can be each formed of 10 subframes; broadcast information can be transmitted in the first subframe in each radio frame; and the paging signal transmitter unit can be configured to preferentially use the tenth subframe and the fifth subframe in each radio frame in this order, as subframes in which the paging signal is transmitted.

In the second aspect, the radio frames can be each formed of 10 subframes; broadcast information can be transmitted in the first subframe in each radio frame; and the reception timing determining unit can be configured to determine the tenth subframe in each radio frame as the timing.

A fifth aspect of the present invention is summarized as a paging signal transmission method in which a radio base station transmits a paging signal for notification of an incoming call for a mobile station belonging to any one of a plurality of groups, the method including the steps of: notifying, from the radio base station to the mobile station, an discontinuous reception interval and a mapping pattern, the discontinuous reception interval representing an interval at which discontinuous reception of the paging signal is performed, the mapping pattern indicating a pattern of a plurality of subframes to which the paging signal is mapped; determining, at the mobile station, a timing for receiving the paging signal, on the basis of the notified discontinuous reception interval and the notified mapping pattern; receiving, at the mobile station, the paging signal transmitted from the radio base station, at the determined timing; and performing, at the mobile station, incoming call processing, when the received paging signal is a paging signal addressed to the mobile station.

A sixth aspect of the present invention is summarized as a mobile station configured to receive a paging signal from a radio base station, the paging signal being used for notification of an incoming call for a mobile station belonging to any one of a plurality of groups, the mobile station including: a reception timing determining unit configured to determine a timing for receiving the paging signal, on the basis of an discontinuous reception interval and a mapping pattern notified by the radio base station, the discontinuous reception timing representing an interval at which discontinuous reception of the paging signal is performed, the mapping pattern being notified of by the radio base station and indicating a pattern of a plurality of subframes to which the paging signal is mapped; a paging signal receiver unit configured to receive the paging signal transmitted from the radio base station, at the timing determined by the reception timing determining unit; and an incoming call processor unit configured to perform incoming call processing, when the received paging signal is a paging signal addressed to the mobile station.

In the sixth aspect, the reception timing determining unit can be configured to determine that the timing is a subframe which is selected from among a plurality of subframes forming a radio frame to which the paging signal is mapped; and the paging signal can be transmitted only in one subframe in a plurality of radio frames.

In the sixth aspect, the reception timing determining unit can be configured to determine that the timing is subframes which are selected from among a plurality of subframes forming a radio frame to which the paging signal is mapped; and the paging signal can be transmitted in two or more subframes in one radio frame.

In the sixth aspect, the reception timing determining unit can be configured to determine that the timing is subframes corresponding to SUBFN in each of radio frames specified by SFN calculated from the following formula:

$$SFN \bmod T = \left\lfloor \frac{T}{N} \cdot (U \bmod N) \right\rfloor \qquad \text{[Formula 4A]}$$

$$SUBFN = U \bmod \left\lceil \frac{N}{T} \right\rceil$$

where "T" represents the number of the radio frames included in the discontinuous reception interval, "N" represents the total number of the groups, and "U" represents identification information on the mobile station.

A seventh aspect of the present invention is summarized as a radio base station configured to transmit a paging signal for notification of an incoming call for a mobile station belonging to any one of a plurality of groups, the radio base station including: a paging signal transmitter unit configured to transmit the paging signal only in one subframe in a plurality of radio frames; and a notifier unit configured to notify, to the mobile station, an discontinuous reception interval and a mapping pattern, the discontinuous reception interval representing an interval at which discontinuous reception of the paging signal is performed, the mapping pattern indicating a pattern of a plurality of subframes to which the paging signal is mapped, wherein a timing for the mobile station to receive the paging signal is determined based on the discontinuous reception interval and the mapping pattern.

A eighth aspect of the present invention is summarized as a radio base station configured to transmit a paging signal for notification of an incoming call for a mobile station belonging to any one of a plurality of groups, the radio base station including: a paging signal transmitter unit configured to transmit the paging signal in two or more subframes in one radio frame; a notifier unit configured to notify the mobile station of an discontinuous reception interval and a mapping pattern, the discontinuous reception interval representing an interval at which discontinuous reception of the paging signal is performed, the mapping pattern indicating a pattern of a plurality of subframes to which the paging signal is mapped; and an adjuster unit configured to adjust the discontinuous reception interval and the mapping pattern, in accordance with the two or more subframes in which the paging signal is transmitted, wherein a timing for the mobile station to receive the paging signal is determined based on the discontinuous reception interval and the mapping pattern.

BRIEF DESCRIPTION OF THE DRAWINGS

FIG. 3 shows diagrams each for explaining the timing for transmitting a PCH in the mobile communication system according to the first embodiment of the present invention.

FIG. 7 shows a diagram for explaining operation of the mobile station to determine the timing for receiving a paging signal according to Alternative Embodiment 1 of the present invention.

FIG. 8 shows a diagram for explaining operation of the mobile station to determine the timing for receiving a paging signal according to Alternative Embodiment 2 of the present invention.

FIG. 9 shows a diagram for explaining operation of the mobile station to determine the timing for receiving a paging signal according to Alternative Embodiment 3 of the present invention.

FIG. 10 shows a table for explaining operation of the mobile station to determine the timing for receiving a paging signal according to Alternative Embodiment 4 of the present invention.

BEST MODES FOR CARRYING OUT THE INVENTION

Configuration of Mobile Communication System According to First Embodiment of Present Invention With reference to FIGS. 1 to 5, the configuration of a mobile communication system according to a first embodiment of the present invention will be described. Note that although this embodiment will be described using a mobile communication system of the LTE system as an example, the present invention is not limited to such example, and can be applied to any other mobile communication systems.

Figure 1:
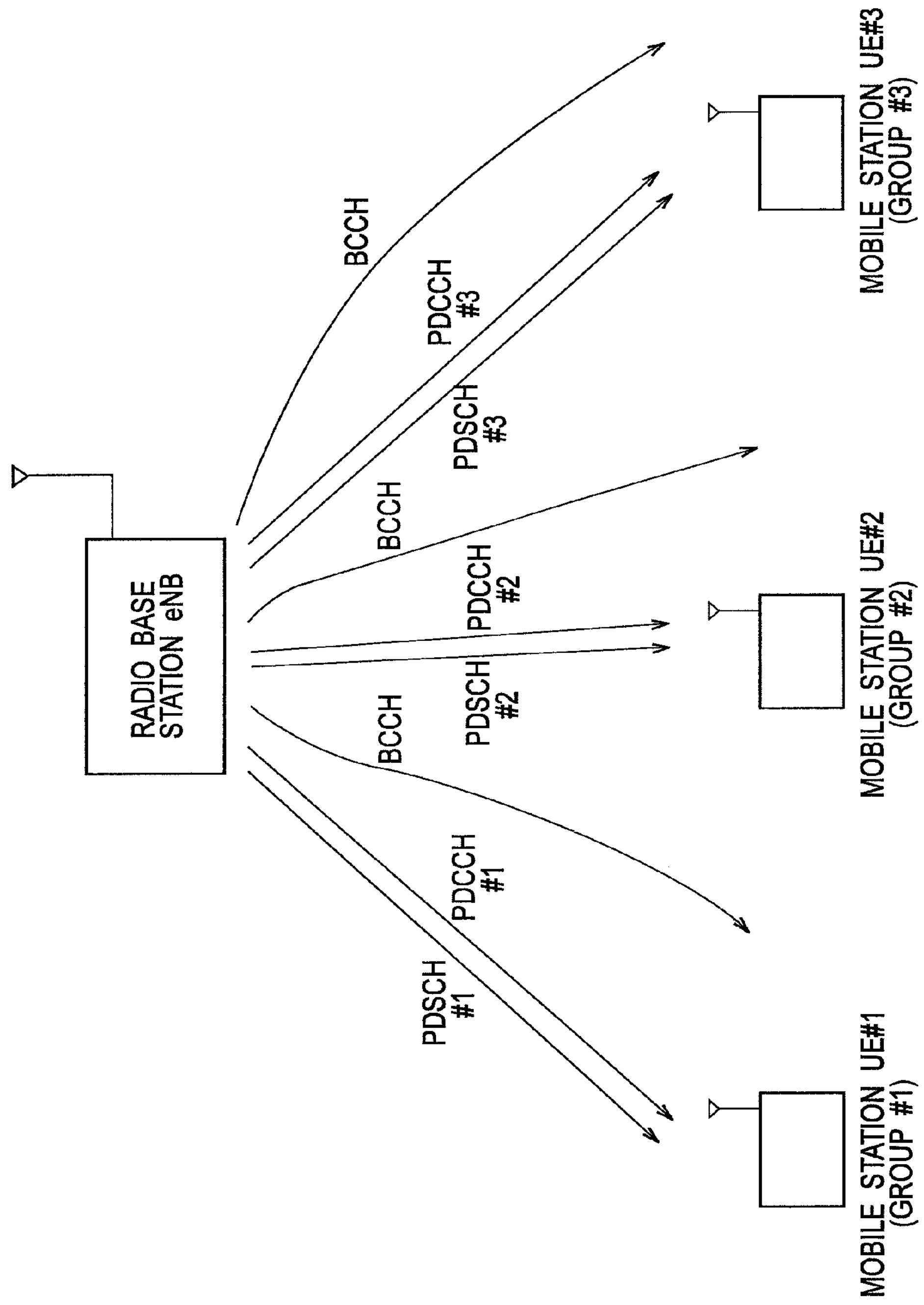
FIG. 1 shows a configuration diagram of an entire mobile communication system according to a first embodiment of the present invention.

As shown in FIG. 1, the mobile communication system according to the first embodiment of the present invention is configured such that a radio base station eNB transmits paging signals (PCHs) for notification of incoming calls for mobile stations UE#1 to UE#3 each belonging to any one of multiple groups #1 to #3.

Specifically, as shown in FIG. 1, the mobile station UE#1 belonging to the group #1 is configured to receive a PCH (paging signal) for notification of an incoming call for a mobile station UE belonging to the group #1, through a PDCCH#1 and a PDSCH#1 transmitted by the radio base station eNB.

Here, a setting is made so that paging DRX interval for all the mobile stations UE belonging to the group #1 would correspond to the timing (subframe unit) for transmitting the PCH for the group #1.

Note that, the paging DRX interval represents a discontinuous reception interval indicating an interval at which to perform discontinuous reception of the PCH (paging signal) notified of by the radio base station eNB.

The mobile station UE#2 belonging to the group #2 is also configured to receive a PCH (paging signal) for notification of an incoming call for a mobile station UE belonging to the group #2, through a PDCCH#2 and a PDSCH#2 transmitted by the radio base station eNB.

Here, a setting is made so that paging DRX interval for all the mobile stations UE belonging to the group #2 would correspond to the timing (subframe unit) for transmitting the PCH for the group #2.

The mobile station UE#3 belonging to the group #3 is also configured to receive a PCH (paging signal) for notification of an incoming call for a mobile station UE belonging to the group #3, through a PDCCH#3 and a PDSCH#3 transmitted by the radio base station eNB.

Here, a setting is made so that paging DRX intervals for all the mobile stations UE belonging to the group #3 would correspond to the timing (subframe unit) for transmitting the PCH for the group #3.

The radio base station eNB is configured to broadcast a BCCH to all the mobile stations UE#1 to UE#3 by using predetermined resource blocks through BCHs (Broadcast Channels) or the PDSCHs.

Figure 2:
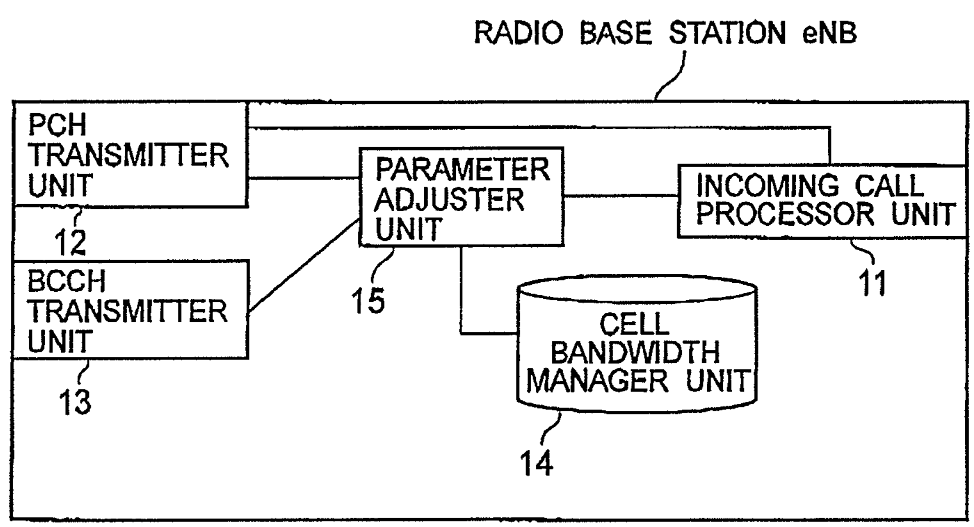
FIG. 2 shows a functional block diagram of a radio base station according to the first embodiment of the present invention.

As shown in FIG. 2, the radio base station eNB includes an incoming call processor unit 11, a PCH transmitter unit 12, a BCCH transmitter unit 13, a cell bandwidth manager unit 14, and a parameter adjuster unit 15.

The incoming call processor unit 11 is configured to monitor the presence or absence of incoming calls for the mobile stations UE#1 to UE#3 each belonging to any one of the multiple groups #1 to #3.

The incoming call processor unit 11 is also configured to forward incoming-call information to the mobile stations UE#1 to UE#3, upon receipt of response signals to the PCHs from the mobile stations UE#1 to UE#3, respectively.

The PCH transmitter unit 12 is configured to transmit the PCHs (paging signals) to the mobile stations UE#1 to UE#3, each of which belongs to any one of the multiple groups #1 to #3, upon detection of incoming calls for the mobile stations UE#1 to UE#3, respectively, the PCHs being used for notification of the incoming calls, respectively.

Specifically, the PCH transmitter unit 12 is configured to determine the way to map each of the PCHs to a subframe.

For example, as shown in FIG. 3(*a*), the PCH transmitter unit 12 may be configured to transmit a PCH (paging signal) in multiple subframes (subframes #0 and #1) in one radio frame (a radio frame #0 or #1).

Alternatively, as shown in FIG. 3(*b*), the PCH transmitter unit 12 may be configured to transmit a PCH (paging signal) only in one subframe (a subframe #0 in a radio frame #0) in any one of multiple radio frames (radio frames #0 and #1).

Meanwhile, the PCH transmitter unit 12 may be configured to change the way to map each PCH to a subframe, depending on the amount of incoming call for the corresponding mobile station UE.

The PCH transmitter unit 12 may also be configured to change the way to map each PCH to a subframe, depending on the available bandwidth in the corresponding cell.

The PCH transmitter unit 12 may also be configured to change the way to map each PCH to a subframe, depending on the frequency of change in the BCCH (broadcast information) in the corresponding cell.

The BCCH transmitter unit 13 is configured to notify, to each of the mobile stations UE#1 to UE#3, the corresponding paging DRX interval (discontinuous reception interval) and the total number of groups through the BCCH.

For example, as the paging DRX interval, the BCCH transmitter unit 13 may transmit identification information which defines the paging DRX interval, or alternatively, transmit the number of radio frames included in the paging DRX interval.

Meanwhile, the BCCH transmitter unit 13 may be configured to notify, to each of the mobile stations UE#1 to UE#3, a corresponding subframe offset M, bitmap, or mapping pattern to be described later, through the BCCH.

The cell bandwidth manager unit 14 is configured to manage the available bandwidth in each cell.

The parameter adjuster unit 15 is configured to adjust the paging DRX interval and the total number of groups, in accordance with the way to map the PCH to a subframe described above.

For example, the parameter adjuster unit 15 is configured to adjust each paging DRX interval and the total number of groups, in accordance with the amount of incoming call for the corresponding one of the mobile stations UE#1 to UE#3.

The parameter adjuster unit 15 is also configured to adjust each paging DRX interval and the total number of groups, in accordance with the available bandwidth in the corresponding cell.

The parameter adjuster unit 15 is also configured to adjust each paging DRX interval and the total number of groups, in accordance with the frequency of change in the BCCH (broadcast information) in the corresponding cell.

Figure 4:
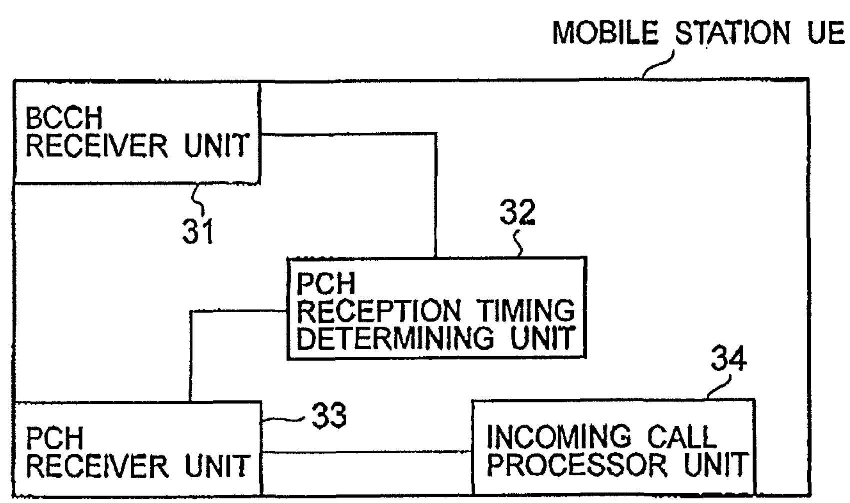
FIG. 4 shows a functional block diagram of a mobile station according to the first embodiment of the present invention.

As shown in FIG. 4, the mobile station UE includes a BCCH receiver unit 31, a PCH reception timing determining unit 32, a PCH receiver unit 33, and an incoming call processor unit 34.

The BCCH receiver unit 31 is configured to receive the above-mentioned paging DRX interval and total number of groups, from the radio base station eNB through the BCCH.

The BCCH receiver unit 31 may be configured to receive the subframe offset M, bitmap, or mapping pattern to be described later, from the radio base station eNB through the BCCH.

The PCH reception timing determining unit 32 is configured to determine the timing for receiving the PCH (paging signal), on the basis of the paging DRX interval and the total number of groups so received.

Specifically, the PCH reception timing determining unit 32 is configured to determine, as the above-described timing, a subframe selected from among multiple subframes (in the example in FIG. 3(*a*), the subframes #0 and #1 in the radio frame #0 or the subframes #0 and #1 in the radio frame #1) to which the PCH (paging signal) is mapped.

Here, the PCH may be designed to be transmitted in multiple subframes in one radio frame as shown in FIG. 3(*a*), or alternatively, transmitted only in one subframe in any one of multiple radio frames as shown in FIG. 3(*b*).

In addition, when "T≥N", the PCH reception timing determining unit 32 may determine, as the above-described timing, a predetermined subframe in radio frames specified by SFN calculated from the following formula:

$$G = U \bmod N$$
$$SFN \bmod T = G \cdot \frac{T}{N}$$ [Formula 5]

In contrast, when "T<N", the PCH reception timing determining unit 32 may determine, as the above-described timing, subframes corresponding to SUBFN in each of radio frames specified by SFN calculated from the above formula:

$$G = U \bmod N$$
$$SFN \bmod T = \left\lfloor \frac{G}{N} \cdot T \right\rfloor$$
$$SUBFN = G \bmod \left( \frac{N}{T} \right)$$ [Formula 6]

Here, "T" represents the number of radio frames included in the paging DRX interval (discontinuous reception interval), "N" represents the total number of groups, "U" represents the identification information on the mobile station UE, and "G" represents the identification information on the group to which the mobile station UE belongs.

Meanwhile, it is conceivable that the hash value of an IMSI (International Mobile Subscriber Identity), a TMSI (Temporary Mobile Subscriber Identity), or the like may be used as the identification information on the mobile station UE, for example.

Figure 5:
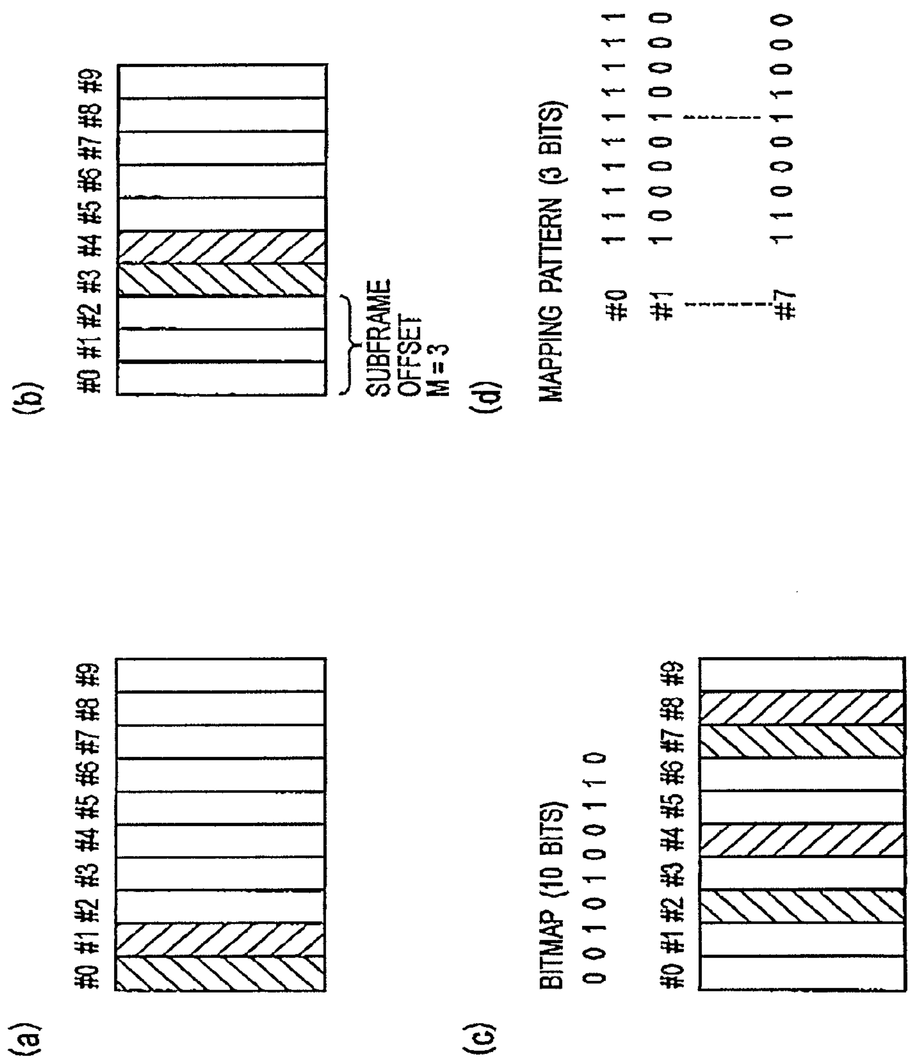
FIG. 5 shows diagrams each for explaining the timing for transmitting a PCH in the mobile communication system according to the first embodiment of the present invention.

As shown in FIG. 5(*a*), the PCH reception timing determining unit 32 may also be configured to determine a predetermined number (e.g., 2) of subframes (e.g., subframes #0 and #1) as multiple subframes in one radio frame in which the PCH is transmitted, the predetermined number of subframes being chosen through sequential selection starting from the head subframe (e.g., subframe #0) in the radio frame.

As shown in FIG. 5(*b*), the PCH reception timing determining unit 32 may also be configured to determine multiple subframes (e.g., subframes #3 and #4) in one radio frame in which the PCH is transmitted, on the basis of a subframe offset M (e.g., M=3) from the head subframe (subframe #0) in the radio frame, the subframe offset M being notified of by the radio base station eNB through the BCCH.

As shown in FIG. 5(*c*), the PCH reception timing determining unit 32 may also be configured to determine multiple subframes (e.g., subframes #2 and #4) in one radio frame in which the PCH is transmitted, on the basis of a bitmap being notified of by the radio base station eNB and indicating multiple subframes to which the PCH is mapped.

For example, if receiving a bitmap (10 bits) shown in FIG. 5(*c*), the PCH reception timing determining unit 32 may determine that the PCH is transmitted in the subframes #2, #4, #7, and #8 in predetermined radio frames.

This notification of the bitmap allows notification of all the possible ways to map the PCH to subframes.

As shown in FIG. 5(*d*), the PCH reception timing determining unit 32 may also be configured to determine multiple subframes (e.g., subframes #0 to #9 (in a case of a mapping pattern #0)) in one radio frame in which the PCH is transmitted, on the basis of a mapping pattern being notified of by the radio base station eNB and indicating a pattern of multiple subframes to which the PCH is mapped.

For example, in a case where the PCH reception timing determining unit 32 stores mapping patterns #0 to #7 shown in FIG. 5(*d*) and receives identification information (3 bits) representing the mapping pattern #0 from the radio base station eNB through the BCCH, the PCH reception timing determining unit 32 may determine that the PCH is transmitted in all the subframes #0 to #9 in predetermined radio frames.

This notification of the identification information indicating a mapping pattern allows notification of various ways to map the PCH to subframes while using a small amount of data.

The PCH receiver unit 33 is configured to receive the PCH (the PDCCH including the P-RNTI and the PDSCH including the PCH) transmitted from the radio base station eNB, in the timing (subframe) determined by the PCH reception timing determining unit 32.

The incoming call processor unit 34 is configured to perform incoming call processing, when a judgment based on the UE-ID included in the PCH received by the PCH receiver unit 33 shows that the PCH is a PCH addressed to its own mobile station UE.

(Operation of Mobile Communication System According to First Embodiment of Present Invention)

Figure 6:
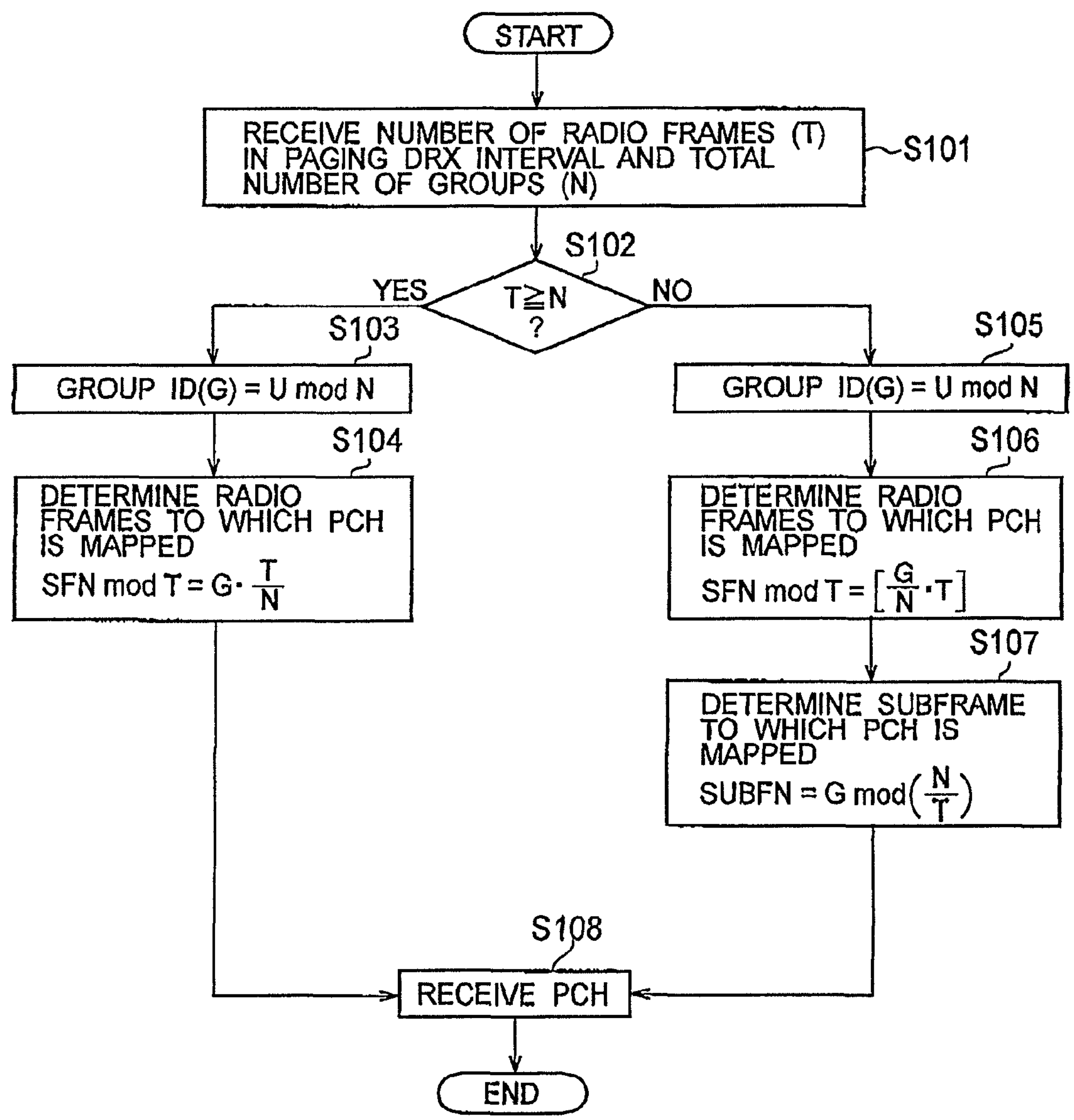
FIG. 6 shows a flowchart illustrating operation of the mobile station according to the first embodiment of the present invention.
Figure 11:
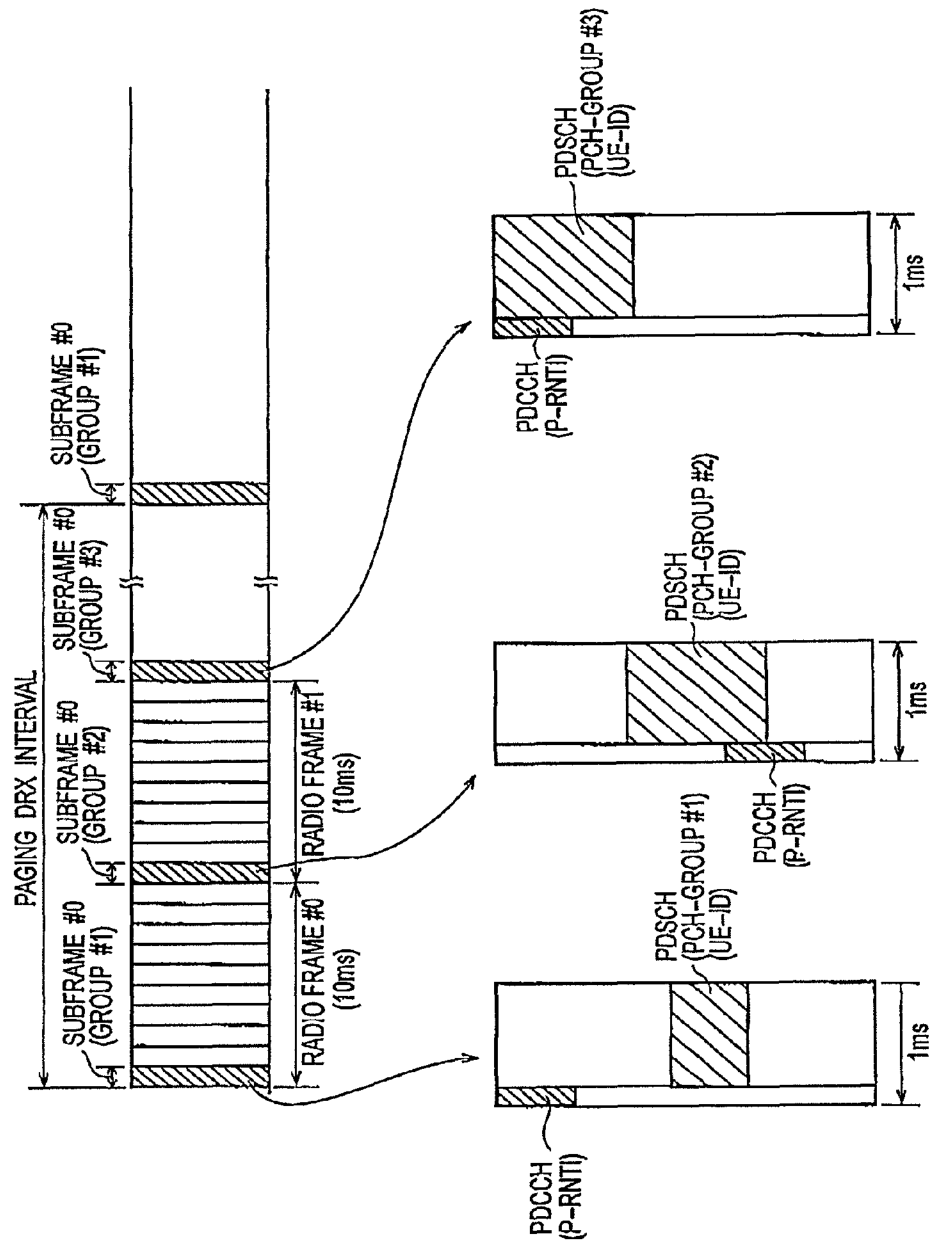
FIG. 11 shows a diagram for explaining PCH transmission timings in a conventional mobile communication system.

With reference to FIG. 6, operation of the mobile station UE in the mobile communication system according to the first embodiment of the present invention will be described.

As shown in FIG. 6, in Step S101, the mobile station UE acquires the number of radio frames (T) included in a paging DRX interval and the total number of groups (N), on the basis of information included in a BCCH received from the radio base station eNB.

In Step S102, the mobile station UE makes a comparison between the number of radio frames (T) included in the paging DRX interval and the total number of groups (N).

If judging that the number of radio frames (T) included in the paging DRX interval is equal to or greater than the total number of groups (N), then, in Step S103, the mobile station UE performs a calculation using "U mod N" to thereby acquire the identification information (G: group ID) on the group to which the mobile station UE belongs.

In Step S104, the mobile station UE determines radio frames specified by SFN satisfying "SFN mod T=G·T/N", as radio frames including a subframe to which a PCH is mapped.

In Step S108, the mobile station UE receives the PCH (a PDCCH and a PDSCH) in a predetermined subframe (e.g., a head subframe #0) in the radio frames specified by the SFN.

On the other hand, if judging that the number of radio frames (T) included in the paging DRX interval is smaller than the total number of groups (N), then, in Step S105, the mobile station UE performs a calculation using "U mod N" to thereby acquire the identification information (G: group ID) on the group to which the mobile station UE belongs.

In Step S106, the mobile station UE determines radio frames specified by SFN satisfying $$SFN \bmod T = \left\lfloor \frac{G}{N} \cdot T \right\rfloor \quad \text{[Formula 7]}$$

as radio frames each including subframes to which the PCH is mapped.

There is a possibility that the PCH is transmitted in multiple subframes in each radio frame determined in Step S106. In Step S107, therefore, the mobile station UE determines subframes specified by SUBFN calculated by "SUBFN=G mod (N/T)", as the subframes to which the PCH is mapped.

In Step S108, the mobile station UE receives the PCH (a PDCCH and a PDSCH) in the subframes specified by the SUBFN in each of the radio frames specified by the SFN.

Note that it is possible to use any of the above-described four methods shown in FIGS. 5(*a*) to 5(*d*) as to which subframe in the radio frame specified by the SFN the SUBFN specifies.

Meanwhile, in this embodiment, after determination of groups as well as determination of the timings (subframes) for transmitting PCHs (paging signals) for the respective groups, the mobile stations UE belonging to the same group (i.e., the mobile stations UE having the same timing (subframe) for transmitting the PCH (paging signal)) can be further divided into subgroups.

Moreover, in this embodiment, as described in Non-patent Literature 2, it is possible to transmit PDCCHs including P-RNTIs which differ from one subgroup to another, or alternatively, to transmit a PDCCH which has a different format from that of a normal one and which includes an identifier of a subgroup to be paged with the PCH (the subgroup here corresponds to the group described in Non-patent literature 2).

In this case, a value which identifies the number of subgroups is included in the broadcast information. Nonetheless, regardless of whether or not to employ the subgrouping as above, the present invention is applicable as a method of determining the timing for transmitting a PCH (paging signal).

(Advantageous Effects of Mobile Communication System According to First Embodiment of Present Invention)

With the mobile communication system according to this embodiment, the timing (subframe) for transmitting a PCH (paging signal) for each group can be changed flexibly.

Here, in this embodiment, reducing the number of groups and thus reducing the number of timings (subframes in which PCHs are transmitted) for transmitting the PCHs (paging signals) is desirable in terms of reduction in the overheads of the PDCCHs for transmitting the PCHs (paging signals).

This is because such reduction allows a single PDCCH transmission to make incoming-call notification (signaling) efficiently for more mobile stations UE.

Meanwhile, when the broadcast information is changed, the radio base station eNB needs to transmit signaling, used to make notification of the change in the broadcast information, so as to prompt the mobile stations UE to re-receive the broadcast information.

Since such signaling needs to be delivered to all the mobile stations UE in an idle mode in each cell, it needs to be repeatedly transmitted at the timings for transmitting the PCHs (paging signals) for all the groups.

In addition, some mobile station UE may possibly fail to receive the signaling at the timing for transmitting the PCH (paging signal) addressed to the group to which the mobile station UE itself belongs. With this taken into consideration, the signaling needs to be transmitted sufficiently repeatedly.

Accordingly, reducing the number of groups and thus reducing the number of timings (subframes in which the PCHs are transmitted) for transmitting the PCHs (paging signals) is desirable in terms of reduction in the overhead of the signaling for notification of a change in the broadcast information.

In this embodiment, on the other hand, reducing the number of groups and thus reducing the number of timings (subframes in which the PCHs are transmitted) for transmitting the PCHs (paging signals) involves a risk of reducing the paging capacity.

This is due to the fact that the number of PDCCHs which can be transmitted per subframe is limited, and also that the number of bits which can be transmitted by a PDSCH is limited and thus the number of UE-IDs which can be included in the PDSCH is limited.

The LTE is a system which supports various bandwidths within a range from 1.6 MHz to 20 MHz, and the above-described limitations are also dependent on the system bandwidth.

Accordingly, in a case where the bandwidth is narrow or where the amount of incoming call is large for a bandwidth, it is desirable to secure the paging capacity by increasing the number of groups and thus increasing the number of timings for transmitting the PCHs (paging signals).

As can be seen, there is a trade-off relationship between the signaling overhead and the paging capacity, and the optimal number of groups is thus dependent on the system bandwidth, the amount of incoming call, and the frequency of change in the broadcast information.

With these taken into consideration, the optimal number of groups should be desirably set from viewpoints of the overhead and the paging capacity.

The present invention can provide a method which allows flexible optimization of the balance between the overhead and the paging capacity on the basis of these conditions.

Alternative Embodiment 1

In Alternative Embodiment 1 of the present invention, the PCH reception timing determining unit 32 of the mobile station UE is configured to determine the timing for receiving a paging signal notified of by the radio base station eNB, on the basis of an discontinuous reception interval (paging DRX interval) representing an interval at which discontinuous reception of the paging signal is performed, and also on the basis of a mapping pattern being notified of by the radio base station eNB and indicating a pattern of multiple subframes to which the paging signal is mapped.

Specifically, as the above-described timing, the PCH reception timing determining unit 32 of the mobile station UE may be configured to determine a subframe specified by i calculated with a formula given in “Subframe index” in FIG. 7, in each of radio frames specified by SFN calculated with a formula given in “Radio frame” in FIG. 7.

Here, as shown in “Example 1” in FIG. 7, with “T=128” and “N/T=4”, in a “UE-ID” formed of 12 bits, the values of bits #1 to #7 are used for the calculation of the radio frame SFN and the values of bits #8 and #9 are used for the calculation of the subframe i, whereas the values of bits #10 to #12 are not used for these calculations.

Moreover, as shown in “Example 2” in FIG. 7, with “T=32” and “N/T=8”, in the “UE-ID” formed of 12 bits, the values of the bits #1 to #5 are used for the calculation of the radio frame SFN and the values of the bits #6 and #8 are used for the calculation of the subframe i, whereas the values of the bits #9 to #12 are not used for these calculations.

Furthermore, as shown in “Example 3” in FIG. 7, with “T=64” and “N/T=¼”, in the “UE-ID” formed of 12 bits, the values of the bits #1 to #4 are used for the calculation of the radio frame SFN, whereas the values of the bits #5 to #12 are not used for these calculations.

Alternative Embodiment 2

In Alternative Embodiment 2 of the present invention, the PCH reception timing determining unit 32 of the mobile station UE is configured to determine the timing for receiving a paging signal notified of by the radio base station eNB, on the basis of an discontinuous reception interval (paging DRX interval) representing an interval at which discontinuous reception of the paging signal is performed, and also on the basis of a mapping pattern being notified of by the radio base station eNB and indicating a pattern of multiple subframes to which the paging signal is mapped.

Specifically, as the above-described timing, the PCH reception timing determining unit 32 of the mobile station UE may be configured to determine a subframe specified by i calculated with a formula given in “Subframe index” in FIG. 8, in each of radio frames specified by SFN calculated with a formula given in “Radio frame” in FIG. 8.

Here, as shown in “Example 1” in FIG. 8, with “T=128” and “N/T=4”, in a “UE-ID” formed of 12 bits, the values of bits #1 and #2 are used for the calculation of the subframe i and the values of bits #3 to #9 are used for the calculation of the radio frame SFN, whereas the values of bits #10 to #12 are not used for these calculations.

Moreover, as shown in "Example 2" in FIG. 8, with "T=32" and "N/T=8", in the "UE-ID" formed of 12 bits, the values of the bits #1 to #3 are used for the calculation of the subframe i and the values of the bits #4 to #8 are used for the calculation of the radio frame SFN, whereas the values of the bits #9 to #12 are not used for these calculations.

Furthermore, as shown in "Example 3" in FIG. 8, with "T=64" and "N/T=¼", in the "UE-ID" formed of 12 bits, the values of the bits #1 to #4 are used for the calculation of the radio frame SFN, whereas the values of the bits #5 to #12 are not used for these calculations.

Alternative Embodiment 3

In Alternative Embodiment 3 of the present invention, the PCH reception timing determining unit 32 of the mobile station UE is configured to determine the timing for receiving a paging signal notified of by the radio base station eNB, on the basis of an discontinuous reception interval (paging DRX interval) representing an interval at which discontinuous reception of the paging signal is performed, and also on the basis of a mapping pattern being notified of by the radio base station eNB and indicating a pattern of multiple subframes to which the paging signal is mapped.

Specifically, as the above-described timing, the PCH reception timing determining unit 32 of the mobile station UE may be configured to determine a subframe specified by i calculated with a formula given in "Subframe index" in FIG. 9, in each of radio frames specified by SFN calculated with a formula given in "Radio frame" in FIG. 9.

Here, as shown in "Example 1" in FIG. 9, with "T=128" and "N/T=4", in a "UE-ID" formed of 12 bits, the values of bits #1 and #2 are used for the calculation of the subframe i and the values of bits #5 to #11 are used for the calculation of the radio frame SFN, whereas the values of bits #3, #4, and #12 are not used for these calculations.

Moreover, as shown in "Example 2" in FIG. 9, with "T=32" and "N/T=8", in the "UE-ID" formed of 12 bits, the values of the bits #1 to #3 are used for the calculation of the subframe i and the values of the bits #5 to #9 are used for the calculation of the radio frame SFN, whereas the values of the bits #4 and #10 to #12 are not used for these calculations.

Furthermore, as shown in "Example 3" in FIG. 9, with "T=64" and "N/T=¼", in the "UE-ID" formed of 12 bits, the values of the bits #5 to #8 are used for the calculation of the radio frame SFN, whereas the values of the bits #1 to #4 and #9 to #12 are not used for these calculations.

Alternative Embodiment 4

In Alternative Embodiment 4 of the present invention, the PCH reception timing determining unit 32 of the mobile station UE is configured to determine the timing for receiving a paging signal, by referring to a mapping table shown in FIG. 10.

For example, when receiving a paging DRX interval "T" and a mapping pattern from the radio base station eNB, the PCH reception timing determining unit 32 of the mobile station UE extracts "Nfr" corresponding to the mapping pattern from the mapping table shown in FIG. 10. Then, the PCH reception timing determining unit 32 calculates "N" from the "Nfr" thus extracted, and applies the "T" and the "N" in any one of the formulae given in "Radio frame" in FIGS. 7 to 9, whereby "SFN" and "i(=SUBFN)" are calculated.

In the example shown in FIG. 10, a paging signal is transmitted only in one subframe in 4 radio frames in a case of notification of a mapping pattern #0.

Here, it is assumed that "i=0" always corresponds to a subframe #9 and the paging signal is therefore transmitted in the "subframe #9" in radio frames specified by "SFN" calculated with any one of the formulae given in "Radio frame" in FIGS. 7 to 9.

A mobile communication system of the LTE system is configured such that: radio frames are each formed of 10 subframes #0 to #9; broadcast information (MIB) is transmitted in the first subframe #0 in each of the radio frames; and broadcast information (SIB1) is transmitted in the sixth subframe #5 in each of the even-numbered radio frames.

Thus, use of some other subframe for the paging-signal transmission is favorable from a viewpoint of securing the paging channel capacity.

In addition, in a mobile communication system of the LTE system, when the broadcast information is changed, notification of the changing is made using a paging signal.

Upon receipt of that notification, the mobile station UE first receives the broadcast information (MIB) transmitted in the first subframe #0, and then receives the broadcast information (SIB1) notified of in the sixth subframe #5.

Use of the tenth subframe #9 for paging-signal transmission is favorable because when notification is made as to a change of the broadcast information, the changed broadcast information can be acquired quickly.

In addition, use of the fifth subframe #4 as the next subframe to the tenth subframe #9 for paging-signal transmission is favorable in dispersing the load on a random access channel when the mobile station UE responds to an incoming call and accesses a network.

In other words, the mobile communication system according to Alternative Embodiment 4 is configured such that the tenth subframe #9 in each radio frame as well as the fifth subframe #4 in each radio frame are preferentially used in this order as subframes in which the paging signal is transmitted.

Here, the operations of the mobile station UE and the radio base station eNB may each be implemented by hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to the processor so that the processor can read and write information from and into the storage medium. Moreover, the storage medium may be integrated into the processor. Additionally, the storage medium and the processor may be provided in an ASIC. The ASIC may be provided in a corresponding one of the mobile station UE and the radio base station eNB. Alternatively, the storage medium and the processor may be provided in a corresponding one of the mobile station UE and the radio base station eNB, as discrete components.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

Note that, the entire content of Japanese Patent Application No. 2008-24620 (filed on Feb. 4, 2008) is incorporated in this description by reference.

INDUSTRIAL APPLICABILITY

As has been described above, the paging signal transmission method as well as the mobile station and the radio base station according to the present invention allow the timing for transmitting the paging signal to be changed flexibly for each group, and thus are useful.

The invention claimed is:

1. A paging signal transmission method in which a radio base station transmits a paging signal for notification of an incoming call for a mobile station belonging to any one of a plurality of groups, the method comprising the steps of:

notifying, from the radio base station to the mobile station, a discontinuous reception interval and a total number of the groups, the discontinuous reception interval representing an interval at which discontinuous reception of the paging signal is performed;

determining, at the mobile station, a timing for receiving the paging signal on the basis of the notified discontinuous reception interval and the notified total number of the groups;

receiving, at the mobile station, the paging signal transmitted from the radio base station, at the determined timing; and performing, at the mobile station, incoming call processing, when the received paging signal is a paging signal addressed to the mobile station, wherein the reception timing determining unit is configured to determine that the timing is a subframe which is selected from among a plurality of subframes forming a radio frame to which the paging signal is mapped;

the paging signal is transmitted only in one subframe in a plurality of radio frames; and the reception timing determining unit is configured to determine that the timing is a predetermined subframe in radio frames specified by SFN calculated from the following formula:

$$G = U \bmod N$$
$$SFN \bmod T = G \cdot \frac{T}{N} \quad \text{[Formula 1]}$$

where "T" represents the number of the radio frames included in the discontinuous reception interval, "N" represents the total number of the groups, "U" represents identification information on the mobile station, "G" represents identification information on the group to which the mobile station belongs, and "T≥N" is satisfied.

2. A mobile station configured to receive a paging signal from a radio base station, the paging signal being used for notification of an incoming call for a mobile station belonging to any one of a plurality of groups, the mobile station comprising:

a reception timing determining unit for determining a timing for receiving the paging signal, on the basis of an discontinuous reception interval and a total number of the groups notified by the radio base station, the discontinuous reception timing representing an interval at which discontinuous reception of the paging signal is performed;

a paging signal receiver unit for receiving the paging signal transmitted from the radio base station, at the timing determined by the reception timing determining unit; and an incoming call processor unit for performing incoming call processing, when the received paging signal is a paging signal addressed to the mobile station, wherein the reception timing determining unit determines that the timing is a subframe which is selected from among a plurality of subframes forming a radio frame to which the paging signal is mapped;

the paging signal is transmitted only in one subframe in a plurality of radio frames; and the reception timing determining unit determines that the timing is a predetermined subframe in radio frames specified by SFN calculated from the following formula:

$$G = U \bmod N$$
$$SFN \bmod T = G \cdot \frac{T}{N} \quad \text{[Formula 1]}$$

where "T" represents the number of the radio frames included in the discontinuous reception interval, "N" represents the total number of the groups, "U" represents identification information on the mobile station, "G" represents identification information on the group to which the mobile station belongs, and "T≥N" is satisfied.

3. The mobile station according to claim 2, wherein the reception timing determining unit determines that the timing is subframes which are selected from among a plurality of subframes forming a radio frame to which the paging signal is mapped; and the paging signal is transmitted in two or more subframes in one radio frame.

4. The mobile station according to claim 3, wherein the reception timing determining unit determines that the timing is subframes corresponding to SUBFN in each of radio frames specified by SFN calculated from the following formula:

$$G = U \bmod N \quad \text{[Formula 2]}$$
$$SFN \bmod T = \left\lfloor \frac{G}{N} \cdot T \right\rfloor$$
$$SUBFN = G \bmod \left(\frac{N}{T}\right)$$

where "T" represents the number of the radio frames included in the discontinuous reception interval, "N" represents the total number of the groups, "U" represents identification information on the mobile station, "G" represents identification information on the group to which the mobile station belongs, and "T<N" is satisfied.

5. The mobile station according to claim 3, wherein the reception timing determining unit determines the two or more subframes used to transmit the paging signal in the one radio frame, on the basis of an offset from a head subframe in the one radio frame, the offset being notified of by the radio base station.

6. The mobile station according to claim 3, wherein the reception timing determining unit determines the two or more subframes used to transmit the paging signal in the one radio frame, on the basis of a bitmap indicating the two or more subframes to which the paging signal is mapped, the bitmap being notified of by the radio base station.

7. The mobile station according to claim 3, wherein the reception timing determining unit determines the two or more subframes in the one radio frame, on the basis of a mapping pattern indicating a pattern of the two or more subframes to which the paging signal is mapped, the mapping pattern being notified of by the radio base station.

8. A radio base station configured to transmit a paging signal for notification of an incoming call for a mobile station belonging to any one of a plurality of groups, the radio base station comprising:

a paging signal transmitter unit for transmitting the paging signal only in one subframe in a plurality of radio frames; and a notifier unit for notifying, to the mobile station, an discontinuous reception interval and a total number of the groups, the discontinuous reception interval representing an interval at which discontinuous reception of the paging signal is performed, wherein a timing for the mobile station to receive the paging signal is determined based on the discontinuous reception interval and the total number of the groups, wherein a reception timing determining unit of the mobile station determines that the timing is a subframe which is selected from among a plurality of subframes forming a radio frame to which the paging signal is mapped;

the paging signal is transmitted only in one subframe in a plurality of radio frames; and the reception timing determining unit determines that the timing is a predetermined subframe in radio frames specified by SFN calculated from the following formula:

$$G = U \bmod N \qquad \text{[Formula 1]}$$

$$SFN \bmod T = G \cdot \frac{T}{N}$$

where "T" represents the number of the radio frames included in the discontinuous reception interval, "N" represents the total number of the groups, "U" represents identification information on the mobile station, "G" represents identification information on the group to which the mobile station belongs, and "T≥N" is satisfied.

9. The radio base station according to claim 8, wherein the radio frames are each formed of 10 subframes;

broadcast information is transmitted in the first and sixth subframes in each radio frame; and the paging signal transmitter unit transmits the paging signal in the tenth subframe in each radio frame.

10. A radio base station configured to transmit a paging signal for notification of an incoming call for a mobile station belonging to any one of a plurality of groups, the radio base station comprising:

a paging signal transmitter unit for transmitting the paging signal in two or more subframes in one radio frame;

a notifier unit for notifying, to the mobile station, an discontinuous reception interval and a total number of the groups, the discontinuous reception interval representing an interval at which discontinuous reception of the paging signal is performed; and an adjuster unit for adjusting the discontinuous reception interval and the total number of the groups, in accordance with the two or more subframes in which the paging signal is transmitted, wherein a timing for the mobile station to receive the paging signal is determined based on the discontinuous reception interval and the total number of the groups, wherein a reception timing determining unit of the mobile station determines that the timing is a subframe which is selected from among a plurality of subframes forming a radio frame to which the paging signal is mapped;

the paging signal is transmitted only in one subframe in a plurality of radio frames; and the reception timing determining unit determines that the timing is a predetermined subframe in radio frames specified by SFN calculated from the following formula:

$$G = U \bmod N \qquad \text{[Formula 1]}$$

$$SFN \bmod T = G \cdot \frac{T}{N}$$

where "T" represents the number of the radio frames included in the discontinuous reception interval, "N" represents the total number of the groups, "U" represents identification information on the mobile station, "G" represents identification information on the group to which the mobile station belongs, and "T≥N" is satisfied.

11. The radio base station according to claim 10, wherein the adjuster unit adjusts the discontinuous reception interval and the total number of the groups, in accordance with an amount of incoming call for each mobile station.

12. The radio base station according to claim 10, wherein the adjuster unit adjusts the discontinuous reception interval and the total number of the groups, in accordance with an available bandwidth in each cell.

13. The radio base station according to claim 10, wherein the adjuster unit adjusts the discontinuous reception interval and the total number of the groups, in accordance with a frequency of change in broadcast information in each cell.

14. The radio base station according to claim 10, wherein the radio frames are each formed of 10 subframes;

broadcast information is transmitted in the first subframe in each radio frame; and the paging signal transmitter unit preferentially use the tenth subframe and the fifth subframe in each radio frame in this order, as subframes in which the paging signal is transmitted.

15. The radio base station according to claim 10, wherein the radio frames are each formed of 10 subframes;

broadcast information is transmitted in the first subframe in each radio frame; and the paging signal transmitter unit transmits the paging signal in the tenth subframe in each radio frame.

* * * * *